United States Patent [19]
Hoy et al.

[11] Patent Number: 5,746,967
[45] Date of Patent: May 5, 1998

[54] METHOD OF CURING THERMOSET RESIN WITH VISIBLE LIGHT

[75] Inventors: Walter S. Hoy; W. Douglas Hoy, both of Huber Heights, Ohio

[73] Assignee: Fox Lite, Inc., Fairborn, Ohio

[21] Appl. No.: 670,642

[22] Filed: Jun. 26, 1996

Related U.S. Application Data

[60] Provisional application No. 60/000,506, Jun. 26, 1995.

[51] Int. Cl.$^6$ ................................. B29C 35/08
[52] U.S. Cl. ............... 264/406; 264/496; 264/40.6; 264/102; 264/570; 425/174.4
[58] Field of Search .................. 264/1.36, 102, 264/406, 570, 40.6, 571, 402, 405, 494, 496; 425/143, 144, 174.4

[56] References Cited

U.S. PATENT DOCUMENTS

| | | |
|---|---|---|
| 4,166,088 | 8/1979 | Neefe . |
| 4,233,396 | 11/1980 | Armstrong et al. . |
| 4,728,469 | 3/1988 | Danner et al. . |
| 4,822,434 | 4/1989 | Sawaki et al. . |
| 5,104,591 | 4/1992 | Masuhara et al. . |
| 5,135,685 | 8/1992 | Masuhara et al. ............ 264/1.36 |
| 5,135,686 | 8/1992 | Masuhara et al. ............ 264/1.36 |
| 5,137,448 | 8/1992 | Dougherty et al. ............ 264/496 |
| 5,332,536 | 7/1994 | Boeckeler . |
| 5,375,187 | 12/1994 | Ibsen et al. . |
| 5,387,105 | 2/1995 | Dougherty et al. ............ 264/496 |

*Primary Examiner*—Mathieu D. Vargot
*Attorney, Agent, or Firm*—Jacox, Meckstroth & Jenkins

[57] ABSTRACT

A transparent mold system (TMS) allows rapid and economical production of thermoset fiber reinforced plastics (FRP) and other thermoset resin parts by heating with visible light energy without using an autoclave, photosensitive resins, or ultraviolet (U.V.) sensitive chemical curing agents. Molding times are accelerated to minutes instead of hours, and the molds are made of transparent plastics materials that can be economically produced by injection, casting, vacuum or pressure forming to replace metal molds and laid-up FRP molds.

14 Claims, 1 Drawing Sheet

1

METHOD OF CURING THERMOSET RESIN WITH VISIBLE LIGHT

RELATED APPLICATION

This application claims the benefit of the filing date of provisional patent application Ser. No. 60/000,506, filed Jun. 26, 1995.

BACKGROUND OF THE INVENTION

In the development of low cost organic matrix composite materials, it has been determined that eliminating the need to process the materials in an autoclave will provide for a significant cost reduction. One method for eliminating an autoclave process is to utilize a relatively slow room temperature curing process. However, a better method would be to eliminate the need to process in an autoclave environment while maintaining the cure characteristics of an elevated temperature.

All thermoset processes involve heating the thermoset resin or resin-fiber materials, and the extent of heating a mold or autoclave are dictated by the chemistry of the resin. Since processing in an autoclave environment increases the cycle cost, resins have been developed for room temperature curing. However, slow room temperature cure resins lead to reductions in facility productivity, and thus a large space and a large number of molds are required to increase production.

Room temperature cures permit the use of low cost mold materials such as wood, plaster or syntactic foam. However, when consideration of costs is limited to mold costs only, the total effect on the cost of the manufacturing process is lost. Fabrication costs for room temperature cure parts are also driven by the time and space required. Total costs include cost for tooling, molds and productivity costs to produce a final product. When the hours of time and large space used to mass produce a room temperature cured product is considered, the advantage of low tooling and mold cost is lost. To increase production, a large number of molds are required and space and mold costs then make the process expensive. As a result, volume mass production costs for the room temperature cure process are higher.

The heated platen thermoset cure process is the fastest cure now used. This process is well suited for mass production of parts, but the mold must be loaded quickly since the cure starts on contact with the hot mold. Thus large parts or parts requiring time consuming lay ups cannot be used with this process. Furthermore, loading of the heated metal platen press mold is difficult since the molds are hot, and must be operated continually hot in order to shorten cycle times. These metal molds are also expensive.

As indicated above, autoclaves are expensive, and cures within autoclaves are relatively slow since the entire autoclave and mold must be heated and cooled in the production cycle. In addition, oven or autoclave cures, use higher cost mold materials such as metals and fiber reinforced plastics (FRP). Also, molds for oven, autoclave or heated platen press processes often utilize imbedded heating or cooling elements to control the process temperatures. Manufacturing costs for a thermally controlled mold or a heated platen press mold are high, and the time required to produce these molds may range from weeks to months. Thus total costs incurred must include mold fabrication and process productivity costs. While heated and cooled molds result in lower production costs due to increased productivity, these costs are offset by substantially higher mold costs.

SUMMARY OF THE INVENTION

Since the manufacturing costs of plastic parts are influenced by the resin, curing process, tooling, machinery and production space required, the transparent mold system (TMS) of the present invention provides for a significant reduction in manufacturing costs by an integrated process that reduces the cost of each item. The transparent mold and visible light heating process of the invention yields an integrated process that addresses all requisite items to make thermoset resins and thermoset FRP suitable for economical mass production.

The transparent mold and visible light heat curing process (TMS) of the invention reduces the manufacturing costs for producing thermoset resin composites, and contrasts with the existing cure systems which are substantially more expensive and slower. The invention also eliminates the need to process molds and parts in an autoclave and utilizes low cost transparent molds and a controlled visible light energy heat source to elevate rapidly the thermoset resin to the cure temperature.

The integrated manufacturing process of the invention exploits the optical properties of polycarbonate and other transparent mold materials and utilizes discrete, light energy heat sources in the visible range to mold and heat cure thermoset resins and thermoset FRP resins. The use of transparent materials for the molds allows the use of visible light as the heating energy source for the curing process without significantly heating the mold or any other component of the system. For example, a polycarbonate mold transmits light in the wavelengths between 450 and 900 nm (nanometers) and is essentially opaque to radiation at longer and shorter wavelengths. Other transparent mold materials have slightly different transmittance spectrums. The visible light heat radiation is absorbed by the black or other optimum color of the uncured thermoset resin which quickly heats to an elevated cure temperature. The thermoset part is rapidly cured without the need to heat an autoclave, platen, oven or mold.

The visible light curing process of the invention also has another significant advantage over room temperature hot platen and autoclave/oven processes. It is possible to elevate temperature quickly and hold a median temperature at the wet-out temperature of the uncured FRP thermoset resin. The wet out temperature is the temperature where the resin liquefies and has its lowest viscosity so that the resin flows easily throughout the transparent mold and FRP matrix. Fully wetting the matrix increases the probability of manufacturing an acceptable composite part. After wetting out, the temperature is then almost instantly raised to the elevated cure temperature for a rapid cure. It is not practical to control precisely the dwell time in the wetting out temperature range with either room temperature, hot platen or autoclave/oven cures.

DESCRIPTION OF THE PREFERRED EMBODIMENT

An article or part P is molded of a thermoset plastic resin or fabrics or fibers impregnated or wetted with a thermoset plastic resin. The thermoset resin is formulated to absorb heat energy in the visible light spectrum by the selection of the color of fabric or resin or the color of both, and by selecting the wavelength of the light energy.

Figure 1:
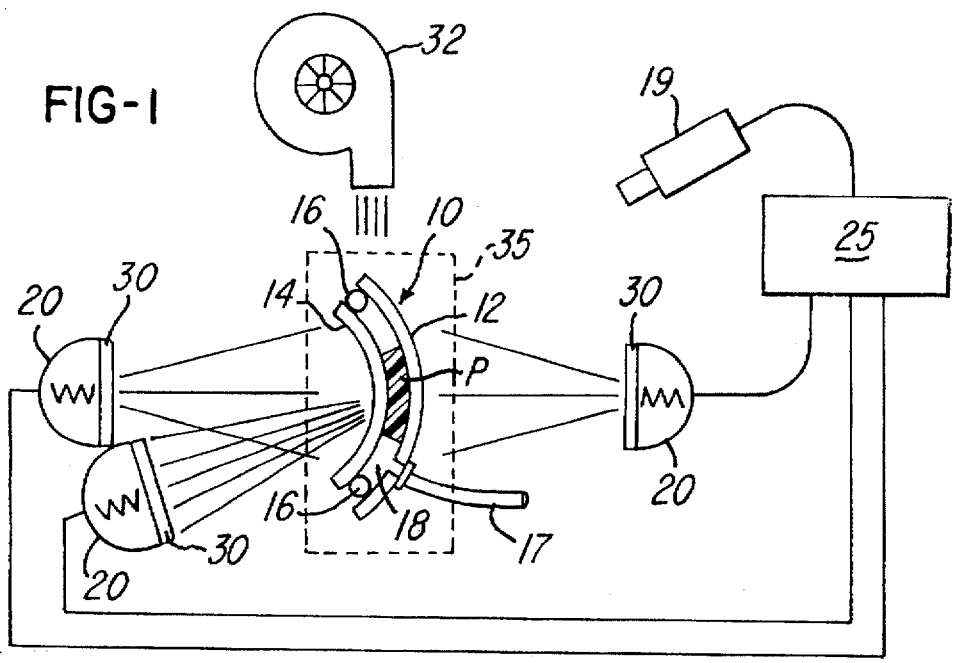
FIG. 1 illustrates diagramatically the light curing apparatus and process of the invention wherein a light source in the visible spectrum is used to radiate thermal energy into an uncured thermoset resin enclosed within a transparent mold.

A visible light transparent mold 10 (FIG. 1) is generally illustrated by a set of arcuate walls 12 and 14 separated by resilient seals 16 and the walls are held together by a suction within a tube 17 to define a mold cavity 18. The walls are constructed of a material that transmits a selected radiated energy in the visible spectrum. The mold walls 12 and 14 are optimized to transmit energy to the resin inside the mold while absorbing a minimum amount of energy in the transparent mold material. This increases heating efficiency of the resin and maintains low mold temperatures needed for transparent plastic molds. Various glass and plastic transparent molds are suitable for a range of temperatures. High energy efficiency is possible since the mold 10 is not heated and cooled, and only the thermoset resin part P is heated.

A hybrid mold system may be used. For example, a metal or other conventional opaque molding material may be used to form the wall 14 while the other wall 12 is transparent. The transparent wall 12 may be used to preassemble a complex time consuming cold lay up of FRP. The conventional opaque wall 14 is kept continually hot with internal heating to assist a cure or just cause the resin to wet out. Radiated visible light energy (heat) is applied through the transparent wall 12 of the mold to accelerate curing of the resin after the mold is closed.

Transparent molds can be made hollow to carry cooling gas or fluid for more flexibility in adjusting mold temperatures. This option is desirable in thicker parts. Cooling is also desirable with resins that exotherm excessively. Multiple segments of transparent molds may be used for forming undercut sections in the resin part or to demold parts without draft. A slightly flexible transparent plastic mold allows for mold twisting to facilitate part demolding in the same fashion as a plastic ice cube tray functions. Flexible transparent molds also allow for demolding using a peeling action. Either wall or both transparent walls of the mold may also be incorporated into the finished part and become a transparent surface of a finished composite structure part by not using a parting agent or by incorporating a bonding agent on the inner surface of each transparent mold wall.

Heat sensors (not shown) may be laminated into the resin part P or enclosed in the transparent mold 10, or non-contact temperature sensing equipment 19 may be used to read the surface temperature of the part P through the transparent mold. The sensing equipment 19 scans the curing part to identify "cool" spots and directs extra visible light energy from spotlights 20 to the cool areas. The energy source lights 20 are selectively turned on and off to control and limit the temperature of the resin. The temperature sensing system feeds data to a closed-loop temperature controller 25 for visible light energy control to maximize resin curing speed and temperatures without exceeding the resin temperature limit.

The controller 25 processes the resin part temperature information from the temperature sensors. The energy source lights 20 are turned on and off or aimed to achieve the desired part temperatures. The closed-loop processor or controller 25 may provide for rapid scanning of the part P in the mold 10. Hot spots will cause an associated light 20 to turn off. Cold spots will command aimable articulated spot lights 20 to concentrate on a cold area to bring that area temperature up to match the rest of the part being cured. Cycle time is minimized by heating the enclosed thermoset resin part P to an isotherm without exceeding the resin maximum cure temperature.

The wavelengths of the visible light heat sources 20 are selected to optimize energy in the frequency spectrum for part heat absorption and to minimize the heat absorption of the transparent mold 10. The array of lights 20 are controlled by the closed-loop temperature controller 25 which blinks lights on and off to adjust the curing temperature of the part P. Auxiliary articulated spotlights 20 may also be controlled to aim extra visible light energy at cool spots. The objective is to maintain an even rapid build up of temperature throughout the thermoset part P as the part cures.

Light filters 30 are used to adjust the spectrum of the light energy. Light energy in the ultraviolet (U.V.) and infrared (I.R.) spectrums will heat transparent plastic molds. This is undesirable, but the filters 30 avoid heating the transparent mold 10. For example, low emissivity glass filters will reflect I.R. energy, and U.V. filter barrier coatings will eliminate energy in the U.V. spectrum. The objective is to maximize radiation of energy in the selected visible wavelengths which are transmitted through the transparent mold walls to heat cure the resin while eliminating other wavelengths that would heat the transparent mold walls. All plastics used in the transparent molds have a heat distortion temperature that should not be exceeded. The light filters 30 minimize energy spectrums that are absorbed by the transparent molds thereby assisting in maintaining the transparent molds at a low temperature.

The vacuum seals 16 may be any conventional seal material compatible with the thermoset resins and transparent mold resins and temperatures. Bleeder blankets that do not interfere with the visible light energy transmission can be used to distribute vacuum within the transparent mold. The number of vacuum ports is selected to remove excess air and resin as long as the plumbing does not block light energy from the transparent wall of the mold.

Air, water or other transparent cooling fluids or gasses from a blower or pump 32 may be directed over or through the transparent mold 10 to reduce mold temperatures during the resin heating and curing process. If additional pressure is required to form or shape the part P, the mold 10 may be enclosed within a pressure vessel 35. A transparent pressure vessel 35 may have the visible light energy sources or lamps 22 located outside of the vessel 35. Conventional opaque pressure vessels may be used when the light energy sources are located along with the transparent mold inside the vessel.

A mold release agent may be used with the transparent molding system of the invention. Since maximum transmissibility in the selected light energy spectrum is desired, chemical compatibility of the release agent with the transparent mold materials and the thermoset resins is also desired.

The transparent mold system of the invention provides for low cost and rapid manufacturing of thermoset composite structures. The system avoids room cure, heated platen press and autoclave processes and the corresponding costs and complexities associated with these processes. The transparent mold production tooling of the invention provides for major cost reductions and productivity increases. Cost savings are achieved by the speed (a number of minutes) which the transparent molds are cycled in the manufacturing process and the low cost of producing a large number or transparent molds required for mass production. The utilization of transparent molds enables the two to be addressed synergistically, that is, high cycle rate and low mold cost.

Figure 2:
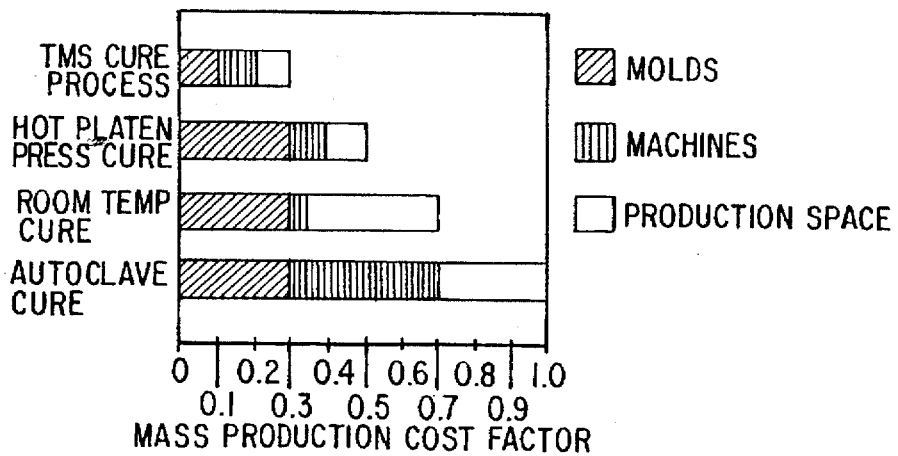
FIG. 2 is a chart which compares the molding process of the invention (TMS) with other known processes relative to a mass production cost factor.
Figure 3:
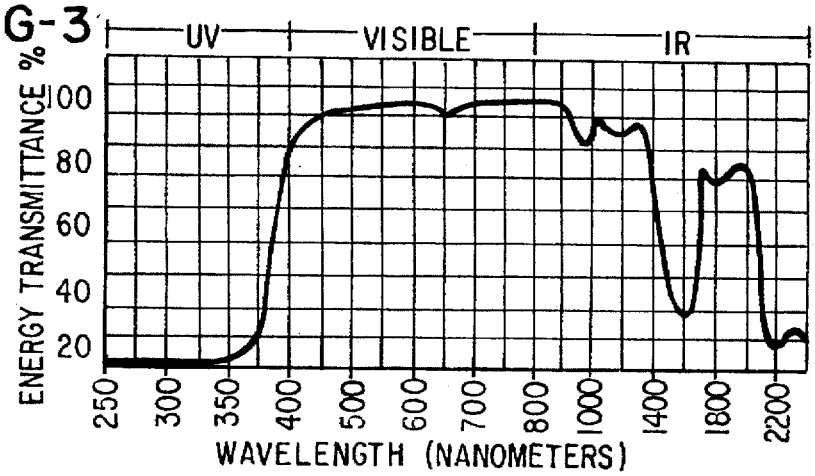
FIG. 3 is a graph showing the percent of energy transmittance for visible light through a clear polycarbonate mold in comparison with ultraviolet light and infrared radiation through the mold.

Transparent molds are able to exploit the cost effectiveness of existing conventional thermoset resins, low tooling costs and fast process times. Transparent molds are quickly mass produced from low cost transparent materials such as clear polycarbonate. Fabrication costs of transparent molds therefore are less than other thermoset molds. Thus the visible light curing process of the invention results in process times and total costs that are substantially less than other thermoset cure processes, as shown in FIG. 2.

The molding process of the invention has two additional areas in production tooling that provide for major manufacturing costs and productivity savings. They are mold replication and quality control. Replication is the manufacture of additional molds to meet production requirements. Replication not only involves the cost to replicate additional tooling exactly, but also the lead time required to produce complex additional molds. Quality control is the ability to replicate exactly the master mold. Quality is highly dependent upon the replication process. The molding process of the invention uses one master mold to produce a large quantity of replicated molds.

Existing techniques for fabrication of molds for conventional thermoset cure processes takes weeks or months to produce an oven/autoclave/heated press cure mold. The fabrication techniques and materials commonly used involve time intensive machining or casting operations to produce individual molds. Replication of additional molds requires either an up front commitment to concurrent multimold fabrication costs or additional lead time to fabricate the required number of expensive molds. In either case, the high fabrication cost of each additional mold remains essentially constant.

Mold quality control is an important factor when a mold design is to be replicated. Variances in conventional heated and cooled molds either must be accepted or high costs will be incurred in assuring the replicated molds exactly match the master mold. Inexpensive transparent molds of the present invention are produced by casting, vacuum forming or pressure-forming a clear material over a master mold. Replication of additional transparent molds utilize the same master mold. The high mold machining, casting, and fabrication costs are incurred only once on the master mold. As a result, a significant cost advantage is realized with the (TMS) second mold and continues with every additional transparent mold replicated.

The mold production process of the invention is a high production rate process and a large number of additional molds can be fabricated within a day as opposed to weeks or months for conventional molds. Since the forming process uses one master mold, all replicated molds are identical, and strict quality control is inherent in the replicating process. As a result of the ability to replicate molds rapidly, molds used in the molding process of the invention are able to transition quickly to production. The ability to transition rapidly to production increases facility productivity and provides for making quick product changes.

While the molding method and form of apparatus herein described constitutes a preferred embodiment of the invention, it is to be understood that the invention is not limited to the precise method and form of apparatus described, and that changes may be made therein without departing from the scope and spirit of the invention as defined in the appended claims.

The invention having thus been described, the following is claimed:

1. A method of molding an opaque article from a non-photosensitive heat-curable thermoset plastics resin having a dark heat-absorbing color, comprising the steps of inserting the resin within a cavity of a mold having a substantially transparent wall portion formed of a material substantially transparent to visible light, closing the mold to confine the non-photosensitive dark color resin within the cavity, heating the resin without substantially heating the transparent mold wall portion by directing visible light energy into the resin through the transparent wall portion for absorption by the dark color resin, and controlling the amount of the visible light energy directed through the transparent wall portion according to the temperature required for heat-curing the non-photosensitive resin.

2. A method as defined in claim 1 and including the steps of sensing the temperature of the non-photosensitive resin while the resin is being heated, and controlling the amount of visible light energy directed through the transparent wall portion in response to the temperature sensed.

3. A method as defined in claim 2 wherein the temperature of the non-photosensitive resin is sensed by a non-contact sensor positioned to detect the resin temperature through the transparent wall portion.

4. A method as defined in claim 1 and including the steps of forming the mold with opposite wall portions of the material substantially transparent to the visible light and defining the cavity between the wall portions for confining the resin, and directing the visible light energy through both of the opposite transparent wall portions for decreasing the time for heat curing the resin.

5. A method as defined in claim 4 and including the step of forming the mold to hold a vacuum within the cavity between the walls, and creating a partial vacuum within the cavity.

6. A method as defined in claim 4 and including the step of pressurizing the opposite wall portions of the mold towards each other with substantially transparent fluid pressure for compressing the resin according to the shape of the cavity.

7. A method as defined in claim 1 and including the step of cooling the mold by directing a substantially transparent cooling fluid in contact with the mold.

8. A method as defined in claim 1 wherein the visible light energy has a wavelength range generally between 450 and 900 nanometers.

9. A method of molding an opaque article from a non-photosensitive heat-curable thermoset plastics resin having a dark heat-absorbing color, comprising the steps of inserting the resin within a cavity of a mold having a substantially transparent wall portion formed of a material substantially transparent to visible light, closing the mold to confine the non-photosensitive dark color resin within the cavity, heating the resin without substantially heating the transparent wall portion by directing through the wall portion into the resin visible light energy, sensing the temperature of the dark color resin while the resin is being heat cured, and controlling the amount of visible light energy directed through the transparent wall portion into the dark color non-photosensitive resin in response to the temperature of the resin being sensed.

10. A method as defined in claim 9 wherein the temperature of the resin is sensed by a non-contact sensor positioned to detect the resin temperature through the transparent mold wall portion.

11. A method as defined in claim 9 and including the steps of forming the mold with opposite wall portions of the material substantially transparent to visible light and defining the cavity between the wall portions for confining the resin, and directing the visible light energy through both of the opposite mold wall portions for decreasing the time for curing the resin.

12. A method as defined in claim 9 and including the step of forming the transparent mold to hold a vacuum within the cavity, and creating a partial vacuum within the cavity.

13. A method as defined in claim 9 and including the step of pressurizing the outer surfaces of the mold wall with substantially transparent fluid pressure for compressing the resin according to the shape of the mold cavity.

14. A method as defined in claim 9 and including the step of cooling the mold by directing a transparent cooling fluid over the mold walls.

* * * * *